Jan. 21, 1969 R. D. BRADSHAW ET AL 3,423,528
ELECTROGRAPHIC DATA SENSING SYSTEM
Filed March 3, 1965
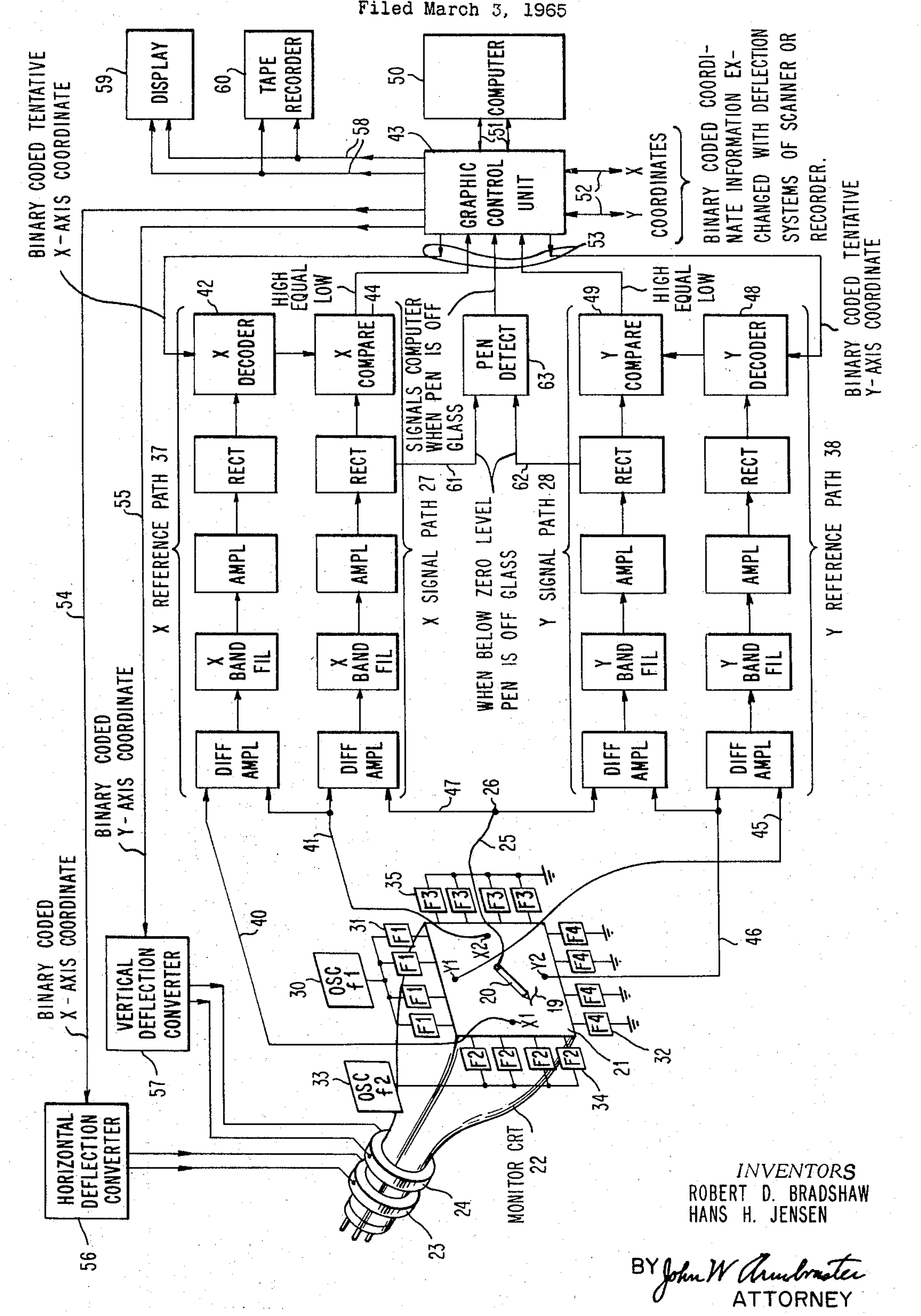
INVENTORS
ROBERT D. BRADSHAW
HANS H. JENSEN
BY John W Armbruster
ATTORNEY

United States Patent Office 3,423,528

Patented Jan. 21, 1969

3,423,528

ELECTROGRAPHIC DATA SENSING SYSTEM

Robert D. Bradshaw, Wappingers Falls, and Hans H. Jensen, Poughkeepsie, N.Y., assignors to International Business Machines Corporation, New York, N.Y., a corporation of New York Filed Mar. 3, 1965, Ser. No. 436,818

U.S. Cl. 178—19 2 Claims

Int. Cl. G08b 5/22

ABSTRACT OF THE DISCLOSURE

The invention relates to graphic control sensing devices for simultaneously measuring the X and Y coordinates of the placement of a conductive pencil touched on the conductive coating of the face of a cathode ray tube. Orthogonal voltage gradients are set up across said coating by means of separate oscillators and filters for the crossing X and Y channels. The carrier frequencies used are different and interference is avoided. By means of a pair of differential amplifiers connected to each signal path and to the pencil, the voltage at the pencil position is compared with a reference voltage of a coordinate as two output voltages are generated. The ratio of these output voltages is a direct measurement of the position of the pencil point which is converted and stored in binary form. A comparative sampling technique is used to compare coordinate points sent by a computer in ever closer values to those required by the pencil point position until equality is achieved.

The present invention relates in general to telescribing and graph tracing devices for sensing and transmitting pointer positions of character, point and graph data, and more particularly for stylus pickup of coordinate representation of data on the face of a cathode ray tube, which data is encoded in binary notation and sent in and out of storage in a computer. A comparative and iterative sampling technique is used to compare coordinate points sent by the computer in ever closer values to those required by a stylus selected point until equality is achieved, the point is converted from analog form, and stored in binary notation.

Plotting devices for providing and analyzing graphical data are useful in many applications for business, military and scientific needs. Conversion from analog representations to binary notation enhances the value of graph sensing means because it puts the data in a form more easily handled and stored in a modern computer. To achieve speed of operation and concurrent analysis, conversion and transmission of rapidly changing graphical data, a design was pursued for a device working on electronic and video principles.

An object of the invention is the provision of pointer or conductive pencil control devices affording graphic communication between an operator and a computer as parts of an image processing system. The devices enable the operator to identify to the storage and program units of the computer, a part of an image displayed by merely pointing the conductive pencil against a vector, point or character of the image. The pencil may also be used as an input device for sketching or tracking when the system is programmed for such modes of control.

Another object of the invention is to provide a method of accurately gauging coordinate reference points of a display by providing both reference points and reference circuits against which both signal pick-offs and signal circuits may be gauged, independent of extraneous influences affecting reference and signal values equally and thus cancelling out. By positioning the cathode ray tube beam at a reference display on the tube screen and comparing the location of the contacting pencil tip with the reference display in a series of successive comparisons of pencil signals with reference levels, the location of the pencil tip is determined and the coordinates of the location stored in core memory storage. As the pencil is moved over the screen, new pencil locations may be determined and stored.

A further object of the invention is to provide improved electrical graphic sensing controls for a data coordinate take-off stylus or contact pencil positioned manually against the face of a data display monitor cathode ray tube. Data acquisition by the conductive pencil is secured by touching the tip of the pencil to a conductive overlay on the face or screen overlay of the tube, said overlay having two perpendicular AC fields of different frequency to establish separate electrical signal voltage level coordinates through the take-off pencil. The conductive overlay border are defined by widely spaced side sets of terminals of perpendicular reference circuits, said reference circuits each duplicating the amplifiers, filters, rectifiers, and voltage gradient decoders of a picked-up signal circuit across a portion of the same reference path. The duplicated reference and signal device technique eliminates errors due to temporary changes in the strength of signals through the conductive overlay.

Another object of the invention is to provide perpendicular grids of parallel electrical areas for reference circuits cooperating across a conductive overlay on the face of a cathode ray tube, said circuits being mutually perpendicular to establish an electrical grid whereon a stylus manually placed differentially will establish selected coordinate signals output voltages according to the graph position selected. The equipotential linear voltages for the coordinate reference circuits make it possible to produce proportional coordinate signal voltages through the take-off pencil at any point over the conductive screen and be independent of noise imposed thereon by conditions outside the reference oscillating circuits and also variations therein.

As implementation for the present invention, an electrically conductive transparent film is provided for the display face of a cathode ray tube, which transparent overlay has two mutually perpendicular AC electrical fields established thereon. These AC fields are distinguished by being of different frequency whereby unique coordinate points may be sensed and interpreted by an electrically conductive take-off pencil put into contact with the electrically conductive overlay material. When operated in a display mode, the data appearing on the screen of the tube provides a location whereon the tip of the electrically conductive pencil may be placed to contact the overlay directly over or aside and related selectively to, a selected part of the indicated display. The filtered voltage gradient from each perpendicular field will be picked up by the data take-off pencil and conducted through separate AC circuits to separate the different circuit potential levels for the binary decoding portions of the system.

In order to provide a uniform gradient pattern over the face of the conductive overlay, the perpendicular electrical fields established horizontally and vertically across the face of the tube are divided into pluralities of parallel conductive paths established by a series of filters, sets of such filters being arranged and evenly spaced along each of the four borders of the square formation of the conductive overlay established on the face of the tube. These parallel crossing paths provide linear equipotential grid voltage lines for both coordinate directions in the conductive material.

Another object of the invention is the provision of a graphic control device in communication with a computer and under control of the program devices and memory unit in said computer. Under control of the program means of the computer, the graphic control unit sends testing or tentative coordinate measurements in binary notations into the measuring circuitry by means of X and Y axis reference decoders which then send such levels to comparators which determine the level values of the binary coordinate input as compared with reference levels derived from widely spaced vertical and horizontal terminals on the tube face coating. The comparators compare the levels with those in the decoders derived from the signal levels of the pencil and then, via the graphic control unit, there is sent to the computer the results of the comparison whether high, low or equal. According to the results of such a comparison, another level is selected in the computer memory and sent therefrom as binary notation coordinates again to the decoder, and the process continues until an equal comparison is obtained. When such an equal comparison is obtained from both the X and Y axis, it is a sign that the tentative coordinates derived from the computer agree with position of the signal sensing pencil and the binary equivalents of such an equal comparison are taken as the coordinates of the pencil and returned to the memory storage unit of the computer.

Another object of the invention is the provision of sampling technique devices cooperating between a graphic control unit and the memory system of a computer. The coordinates of all the points in a display are stored in the memory of the computer. When it is desired to enter graphic information into the system by means of a pencil on a monitor tube, the position of the pencil on the conductive layer as a function of time is continuously sampled by the graphic control unit under control of the program devices in the computer. When the graphic control unit acquires a new set of coordinates, it transmits them to the computer where the coordinate data for the display is then updated. The sampling rate is controlled by the program devices of the computer. While information is being entered by means of the conductive stylus, the display may be continuously revealed on the tube by the graphic control unit under control of the program devices of the computer.

Another object of the invention is to make it possible to transmit and utilize the pictorial data picked up by the graphic control unit to other remote scan and record sections of the system, in addition to, or instead of, the immediate monitor tube used in the immediate location. Another use contemplated by the invention is the direction of the output of the graphically derived data into any standard output device such as direction into a recording tape for permanent storage.

Another object of the invention is the provision of referencing technique devices for a pencil pick-up graph control system to eliminate errors due to temporary changes in the signals in the conductive layer, such as variations in the oscillator amplitudes or noise. Since the referencing circuits and signal circuits are arranged in parallel, have similar components and work together simultaneously, they serve to cancel out any extraneous effects which are liable to impinge upon both at the same time. Should there be any permanent errors in the system, such as nonlinearities in the conductive coating, such errors can be corrected for by a correction routine in the program devices of the computer.

Another object of the invention is to provide means for the storage and delivery of a set of sampling coordinate values in digital form for comparison with graph coordinate values also representative of digital values of a scanner output. Each supplied coordinate sample value is taken out of storage and sent into a comparing circuit wherein it is proportioned as a discrete part of a reference voltage which reference portion voltage level is then compared with another voltage level which is generated as representative of a graph point selected by an electrical take-off pencil pointed at a particular graph coordinate spot. Lack of correspondence of the two voltage levels causes continuous sampling with ever closer matching until equality is achieved.

A further object of the invention is the provision of a high, low and equal comparing means cooperating with a graph dimension take-off system.

Another object of the invention is the provision of an improved comparing means wherein voltages compared are based on a generic reference voltage level wherein of the data is immediately available at all stations, a teleproved accuracy.

A further object of the invention is the provision of means for signalling when a take-off pencil is lifted above a conductive overlay of an electrical graphic display unit. The pencil's coordinate signal circuits feed amplifiers which are sensed for minimum voltage levels to indicate when the take-off pencil is removed from a data representing position.

Another object is to provide means to send take-off graphic display readings to a plurality of remote indicators for multiple display purposes. The coordinate identifying potentials are converted to binary signals developed as the stylus traces out written data information or other traced designs on the writing surface, these signals are then transmitted by convenional means to a remote computing station and retransmitted therethrough to one or more other remote stations. Through the computer storing means there is generated instantaneously a replica of the data picked up from the writing surface. Since a record of the data is immediately available at all stations, a telewriting communication system is readily realized.

It is also an object of the invention to provide electrographic means suitable for use in conference systems wherein received images are retained for relatively long periods of time. Since the conductively coated glass sheet forms part of a cathode ray tube, the type of tube selected may be of a character wherein the projected images are retained on the exterior glass envelope for an extended period of time. Therefore, an operator may add to or modify the image according to latest information at hand and reveal the same throughout the conference system.

The foregoing and other objects, features and advantages will be apparent from the following more particular description of the preferred embodiment of the invention as illustrated in the drawings wherein the sole figure is a schematic diagram of a graphic pick-off system involving a computer and one or more cathode ray tube monitor and operating stations for generating and reading display data to be transmitted and stored or retransmitted between similar units of a complex system.

Now, more particularly as to the reading of the position of a manipulated conductive pencil 20, reference is made to the left side of the drawing where the pencil 20 is seen to be placed against or poined onto a graph line trace 19 showing through a conductive translucent or transparent film or coat 21 deposited uniformly all over the flat outer glass face of a monitor cathode ray tube 22. Pencil 20 has a conductive elongated core covered with insulation for handling, pointing and data take-off purposes. At its upper end, pencil 20 has an attached conductor or wire 25 extending from the conductive core to the junction 26 of a pair of sets of X and Y signal path devices shown in path arrays 27 and 28. The size of the signals sent along paths 27 and 28 depends on the coordinate positioning of the pencil tip with regard to voltage gradient spans defined by outer reference limit terminal attachments X1 and X2 for an abscissa and Y1 and Y2 for an ordinate.

These reference voltage spaces across the conductive area 21 are electrically prepared by perpendicularly directed pairs of currents of different frequency. An oscillator 30 operating at a frequency *f*1 sends vertical electrical currents through a series of evenly spaced filters F1 wired to successive sections of the top of the conductive coating 21 and, at the bottom of the same, is a related series of filters F4 connected between the coating 21 and ground connections. In a similar fashion, another oscillator 33 operates at a frequency $f2$ and sends horizontal currents through a set of regularly attached filters F2 connected along the left border of the conductive coating 21 and across from which on the right border are wired a set of filters F3 also grounded.

In order to be independent of variations of wear on the conductive surface, variations in power supply strength, noise, etc., a pair of sets of reference path control devices 37 and 38 are wired across the area of the tube face to terminals X1, X2 and Y1, Y2, respectively, and within the borders of the conductive face 21. For any one axis, the reference path measures the total voltage across one axis of the work area, while the pencil selected signal path measures the signal along the same axis from the pencil tip to one side of the work area arbitrarily selected as the low side. Thus it is that between wires 40 and 41 there is picked up a total voltage to be directed along the X reference path 37 and the controls therein comprising a differential amplifier, X band filter, amplifier, rectifier and into an X decoder 42 wherein a voltage level is altered or scaled down from the axis total reference value by an amount equivalent to a binary coordinate input from a graphic control unit 43 which is computer program controlled for iterative testing with the signal level in the comparator 44 of the X signal path 27. Between wire 41 and pencil wire 47 there is connected a series of electrical controls including a differential amplifier, X band filter, etc., to produce in comparator 44 a voltage level which is so accurately proportioned with respect to the reference voltage as to represent the position of the pencil tip along the X axis and thus be effective for comparison in unit 44 with a tentative value proposed by the computer and to render therefrom an equal, high or low indication to be sent back to the graphic control unit 43 for either closer iterative test value trails, or the "equal" indication showing that the correct binary coded coordinate has been found and may be stored and used. The Y axis devices in the Y signal path 28 and Y reference path 38 operate in a similar fashion by means of a reference level maintained between wire 45 and wire 46, and a signal level picked up between pencil wire 47 and wire 46. The Y signal and reference levels are compared between the settings of the Y comparator 49 and the Y decoder unit 48 and used as in the case of the X comparisons.

The graphic control unit 43 has a communications link with a computer 50 which controls its operation. Under the control of the program and storage means of the main computer, the control unit 43 sends a tentative coordinate in binary digits to each axis decoder 42 and 48 which in turn sends voltage levels to related comparators 44 and 49, said levels being a function of the binary coordinate input and the axis reference levels of the moment. Comparators 44 and 49 compare the voltage levels from the decoders 42 and 48 with the respective signal levels and send to the graphic control unit 43 the results of the comparisons (whether high, equal or low). From the results of these comparisons, other levels are selected and sent to the decoders 42 and 48. The trial process continues until equal comparisons are obtained from both the X and Y axes and then the last tentative coordinates which caused the equal comparisons are taken and stored in the computer memory as the coordinates of the pencil point takeoff position.

As noted by the two-way connections 51 and 52 to the graphic control unit 43 at the lower right side of the drawing, graphic data may be exchanged with the computer 50 and also exchanged through connections 52 with real time precision deflection systems such as those of scanners or recorders of maps, charts, scenes, written or printed matter, or any pattern yielding prospect or view. The coordinates of all points in a display are stored in the memory of the main computer 50. When it is desired to enter graphic information into the system via the pencil 20 on the monitor tube 22, the position of the pencil on the conductive glass 21 as a function of time is continuously sampled by the graphic control unit 43 under control of the main computer program as already noted. When unit 43 acquires a new set of coordinates, it transmits them to the computer memory where the coordinate data for the display is then updated. The sampling rate is, of course, controlled by the program means of the main computer. While information is being entered via the pencil, the display trace or outline 19 may be continuously revealed on the cathode ray tube 22 by the graphic control unit 43 under control of the program of the computer 50. For such purposes, the lines 54 and 55 out of the unit 43 carry binary coded X and Y coordinate values into the respective deflection converting decoders 56 and 57 which are wired to the horizontal and vertical deflection yokes 23 and 24 for controlling the display beam of tube 22.

At the discretion of the operator, the graphics control unit 43 can switch on corrections to lines such as 52 and 58 to transmit pictorial or other display data to other scan, record and display units 59 or tubes of the whole system rather than merely connect the monitor CR tube 22 alone to the unit 43 and the computer 50. It is also possible to output the data for a display contained in memory through lines 58 and into any standard output recorder device such as a tape recorder 60 for permanent storage.

The referencing technique for the pencil position control herein noted, eliminates errors due to temporary changes in the signals on the conductive plane 21, such as variations in the oscillator amplitudes or noise. Permanent errors such as non-linearities in the conductive coating 21 can be compensated for and corrected by a correction routine in the main program.

Another control is provided to send a signal to the graphic control unit 43 whenever the pencil 20 is lifted off the conductive coating 21. Wires 61 and 62 are connected to bridge a pencil detector unit 63 between the two rectifiers of the X and Y signal path devices. When the pencil 20 is lifted out of contact with the tube face coat 21, both signal levels are below zero as detected by the rectifier stages, and these low levels in unit 63 are converted to an output signal from unit 63 to the graphic control unit 43 so that it may suspend trial comparisons until a definite signal position is again established.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In combination, a writing surface composed of a sheet of material having a uniform resistance over an exposed area, a first generator for alternating potentials of a first frequency, means for applying potentials from said first generator across said writing surface in one coordinate direction, a first reference circuit across said surface in said one direction, a band pass filter means having an input circuit connected to said first circuit, a second generator for alternating potentials of a second frequency, means for applying potentials from said second generator across said writing surface in a second coordinate direction, a second reference circuit across said surface in said second direction, a second band pass filter means having an input circuit connected to said second circuit, a pair of signal circuits parallel with said reference circuits and similar thereto, an electrically conductive writing stylus in contact with said writing surface and connected to input circuits of said signal circuit pair, and means for proportioning the output of the signal circuits according to the outputs of the reference circuits, whereby the single frequency potentials passed by each filter means and proportioning means have output amplitudes representative of the coordinate positions of the said writing stylus.

2. Apparatus comprising:

a sheet of electrically conductive transparent material having a uniform electrical resistance in all linear directions;

an A.C. source applied across said sheet in a first direction to establish a substantially linearly varying first A.C. field along said first direction;

a second A.C. source applied across said sheet in a second direction to establish a substantially linearly varying second A.C. field along said second direction;

an electrically conductive pencil adapted for contact with said sheet;

a first set of reference terminals connected adjacent opposite ends of said sheet along said first direction;

a second set of reference terminals connected adjacent opposite ends of said sheet along said second direction;

first reference measuring means connected to said first set of reference terminals for selectively measuring the voltage from said first A.C. source appearing across said first set of reference terminals;

second reference measuring means connected to said second set of reference terminals for selectively measuring the voltage from said second A.C. source appearing across said second set of reference terminals;

means connected to said pencil for selectively coupling to first signal means for selectively measuring voltages from said first A.C. source and to second signal means for selectively measuring voltages from said second A.C. source;

means for comparing the measurements of said first and second signal means with the measurements of said first and second reference measuring means for providing accurate indications of corresponding locations of said pencil on said sheet;

means for providing calculations of the difference provided by said comparisons for recalculating the coordinate values relative to said first and second reference measuring means and providing gradual accurate computation of the coordinate position indicated by said pencil when in contact with said sheet.

References Cited

UNITED STATES PATENTS

| | | | |
|---|---|---|---|
| 2,241,544 | 5/1941 | Dreyer | 178—20 |
| 2,527,835 | 10/1950 | Miller | 178—19 |
| 2,565,612 | 8/1951 | Levin | 178—19 |
| 2,583,720 | 1/1952 | Adler | 178—19 |
| 2,925,467 | 2/1960 | Becker | 178—18 |
| 2,965,715 | 12/1960 | Adler | 178—19 |
| 3,102,926 | 9/1963 | Fluhr et al. | 178—19 |
| 3,106,707 | 10/1963 | Thompson | 343—7.3 |

THOMAS A. ROBINSON, *Primary Examiner.*

U.S. Cl. X.R.

235—198